United States Patent [19]

Ramunni et al.

[11] Patent Number: 6,022,634
[45] Date of Patent: Feb. 8, 2000

[54] MEMBRANE ELECTROCHEMICAL CELL PROVIDED WITH GAS DIFFUSION ELECTRODES IN CONTACT WITH POROUR, FLAT, METAL CURRENT CONDUCTORS HAVING HIGHLY DISTRIBUTED CONTACT AREA

[75] Inventors: Enrico Ramunni, S. Donato; Giampiero Fleba, Milan; Massimo Brambilla, Bussero, all of Italy

[73] Assignee: De Nora S.p.A., Italy

[21] Appl. No.: 08/881,530

[22] Filed: Jun. 24, 1997

[30] Foreign Application Priority Data

Jun. 26, 1996 [IT] Italy .................................. MI96A1293

[51] Int. Cl.[7] .............................. H01M 2/00; H01M 8/10; H01M 6/48

[52] U.S. Cl. ................................. 429/34; 429/27; 429/30; 429/41; 429/42; 429/210

[58] Field of Search .................................. 429/27, 30, 34, 429/41, 42, 191, 210

[56] References Cited

U.S. PATENT DOCUMENTS

| | | | |
|---|---|---|---|
| 4,732,660 | 3/1988 | Plowman et al. | 204/265 |
| 4,876,115 | 10/1989 | Raistrick | 427/115 |
| 5,460,705 | 10/1995 | Murphy et al. | 204/252 |
| 5,482,792 | 1/1996 | Faita et al. | 429/30 |
| 5,635,039 | 6/1997 | Cisar et al. | 204/252 |

*Primary Examiner*—Maria Nuzzolillo
*Assistant Examiner*—Tracy Dove
*Attorney, Agent, or Firm*—Bierman, Muserlian and Lucas

[57] ABSTRACT

The present invention refers to an electrochemical cell or stack of cells comprising two end-plates (7), bipolar plates (1) made of metal or metal alloy, gas permeable metal distributors (2), metal current collectors(3), gasket frames (4) provided with channels for feeding the gaseous reactants and discharging the excess reactants and condensates, a couple of gas diffusion electrodes, (5), an ion-exchange membrane (6), wherein said current conductors provide for a highly distributed segmented contact area on the electrode surface without isolated peaks and have an extremely smooth surface without asperities and at the same time porous and permeable to the gas flow.

14 Claims, 3 Drawing Sheets

MEMBRANE ELECTROCHEMICAL CELL PROVIDED WITH GAS DIFFUSION ELECTRODES IN CONTACT WITH POROUR, FLAT, METAL CURRENT CONDUCTORS HAVING HIGHLY DISTRIBUTED CONTACT AREA

The fuel cell is an electrochemical apparatus wherein the free energy of reaction power generated from the combination of a fuel (for example hydrogen or mixtures thereof) with a comburent (for example pure oxygen, air, chlorine or bromine) is not completely transformed into thermal energy but converted into electrical energy in the form of continuous current. The fuel is fed to the anode, which has a negative polarity, and the comburent is fed to the cathode, which, conversely, has a positive polarity. Electric energy generation in the most common fuel cells, that is those fed with hydrogen and oxygen or mixtures containing the same, is extremely interesting in view of the high efficiency and low or no environmental pollution (absence of poisoning emissions and noise).

The fuel cells may be schematically classified referring to the type of electrolyte separating the anode and cathode compartments and consequently by the range of temperatures of operation. This classification directly reflects on the identified or envisaged use of these systems. In particular, fuel cells operating at high temperature, that is above 200° C., are going to be an alternative source of electric current in large size power plants, also in view of the interesting possibility of co-generation allowed by the high thermal level. Conversely, in the range of low temperatures (25–200° C.) an ever increasing interest is focused onto solid polymer electrolyte fuel cells fed on one side with hydrogen (pure or as mixtures coming from the catalytic conversion of a precursor thereof) and on the other side with pure oxygen, or better with air.

These systems offer many advantages such as a quick start-up, peak power outputs, high electrical efficiency in a wide range of power outputs. For these reasons, solid polymer electrolyte fuel cells find the most desirable application in the domestic generation of power, small DC generators, high efficiency recovery of by-product hydrogen from chemical and electrochemical plants, electric automation.

The most typical solid polymer electrolyte is the ion-exchange membrane, characterized by a high efficiency in the transport of $H^+$ ions, in other words by high ionic conductivity. This type of electrolyte has been developed as an alternative to conventional acid or alkali solutions (for example orthophosphoric acid or potassium hydroxide) to solve the problems connected with the use of liquid electrolytes which, although embedded in a porous matrix, impose severe limitations even to an instant pressure unbalance between the two compartments. Further, these electrolytes are corrosive and require the use of extremely expensive materials. The use of a polymeric membrane as the electrolyte however poses problems as regards the gas diffusion electrodes commonly utilized in fuel cells operating at low temperature in an acid environment, as described for example in U.S. Pat. No. 4,647,359. In fact the interface between the electrode and the electrolyte is a discontinuity area as concerns the electric current transmission wherein the charge carriers supporting the process on one side are the electrons and on the other side, as aforementioned, the $H^+$ ions. It is therefore of paramount importance to maximize the points of triple contact concerning at the same time the catalytic particles activating the electrodes where the two half-reactions of electron consumption and proton generation or viceversa take place, the electrodes being in turn in direct contact with the support ensuring for the electronic conductivity;

the hydrophobic channels ensuring for the gaseous reactants feed necessary to obtain said half-reactions;

the electrolyte which acts as ionic transporter.

A solution to this problem has been attempted by hot pressing of the electrodes onto the ion-exchange membrane, as described in U.S. Pat. No. 3,134,697. Another solution suggests the intimate contact of the catalytic particles with a protonic conductor before interfacing the electrode with the electrolyte, as described in U.S. Pat. No. 4,876,115.

A combination of these two techniques, which should give to the electrode-membrane assembly the desired characteristics, is not completely satisfactory for industrial applications. In particular, hot pressing of the two electrode onto the solid polymer electrolyte is an extremely expensive procedure as it cannot be automated due to the fact that each electrode-membrane assembly must be subjected to heat and pressure for a sufficient time to obtain an intimate contact among the components, typically for some minutes; this procedure must be carried out at a temperature above 100° C. and at a relative humidity of 100%, to avoid irreversible decay of any membrane commercially available or described in the literature. Further, the high cost of the components makes unacceptable any discard, which usually occurs in a mass production of this kind. In these production processes several parameters (times, temperatures, pressures, relative humidity) must be carefully controlled within strict tolerances. Furthermore, the polymeric membranes under a thermal cycle and variations of the relative humidity undergo severe swelling while the electrodes experience no expansion. This different behaviour in terms of swelling of the membranes gives rise to dangerous internal stresses at the interface which could damage the heat-pressed samples. Therefore the samples must be kept under strictly controlled conditions after assembling in the cell, thus adding to the already high costs of this process.

These shortcomings, which substantially hindered industrial exploitation of the solid polymer electrolyte fuel cell, are partially mitigated in the cell described in U.S. Pat. No. 5,482,792. This cell comprises an electrode-membrane assembly, subjected to hot pressing inside the cell itself, once assembled, after alignment of the different components, by means of an electroconductive collector having a residual deformability which provides for a highly distributed electric contact surface while distributing the clamping pressure on both electrodes on a multiplicity of contact points. However, this solution leaves some fundamental problems still unsolved, which the present invention intends to overcome. In particular, it must be noted that an industrial success will be attained only by increasing the efficiency and current density of the present systems, at the same time reducing the cost of the valuable components (membranes and electrodes).

For these reasons, fuel cells of industrial interest must be equipped with membranes, already available on the market, of extremely reduced thickness in order to minimize both their electric resistance (and thus the efficiency at the same specific power and the current density per unit of weight and volume) and the quantity of polymer to be used per unit of active surface area (thus the cost of polymer per unit of power). Further, systems of real commercial interest must use electrodes at high specific degree of exploitation of the catalyst, essentially different than those described in U.S. Pat. No. 5,482,792. In fact these electrodes comprise protective mechanical supports such as carbon cloth or graphite paper, which impose additional resistive penalties and do not permit a high degree of exploitation of the catalyst. The innovative components cannot be used without protective support in the cell described in U.S. Pat. No. 5,482,792, as the collectors exhibit dangerous protruding terminal sections which may damage the thin membrane. The scope of these terminal sections is specifically claimed to provide an efficient electric contact with bipolar plates made of passivatable metals. Further, the use of electrodes, the non-active surface of which is essentially made of graphite or conductive carbon, requires not only that the contact be as de-localized as possible but also homogeneously distributed, to avoid resistive penalties due to a too large extent of current flow onto the electrode surface, which has fairly good conducting properties but not comparable, for example, with those of a metal. The collectors described in U.S. Pat. No. 5,482,792 do not provide for a sufficient homogeneity as required for highly advanced performances.

It is an object of the present invention to provide for a novel design of a membrane electrochemical cell comprising at least a gas compartment, for example a polymer fuel cell, capable of overcoming the drawbacks of the prior art.

In particular, the invention concerns a single electrochemical cell or a stack of electrochemical cells in electrical series, separated by metal bipolar plates, equipped with ion exchange membranes acting as the electrolyte, and two electrodes, preferably having a thickness below 0.03 mm, at least one of which is of the gas diffusion type. In the compartments with a gaseous phase operating with a gas diffusion electrode, the current collector in contact with the electrode surface and the metal conductive distributor for the gaseous flow are separate and distinct, although in contact with each other, to provide for the electrical continuity.

In some of the preferred embodiment, the current collector is made of a reticulate metal material having an initial diameter of the pores comprised between 0.05 and 5 mm and an initial thickness of about 2 mm, commercially known as metal foam and illustrated in FIG. 2, which is subjected to a pressure sufficient to collapse all the tridimensional cells initially present in the material. The final product has an essentially constant thickness, comprised between 0.1 and 0.5 mm, without any residual deformability and exhibits an extremely smooth surface without any protrusion, with a porosity of about 50%. The final aspect of the collector is illustrated FIG. 3.

In another embodiment, the collector is made of a metal gauze, essentially smooth and having a thickness comprised between 0.1 and 0.3 mm, with a porosity of about 50%. In both cases, the material of the collector belongs to the group comprising stainless steels, high-alloy steel, Hastelloy, nickel, nickel-chromium, titanium coated by conductive oxides, noble metals.

In some embodiments, the gas distributor is made of a reticulated metal, that is the aforementioned metal sponge, not collapsed through any mechanical procedure, and thus exhibiting characteristics of residual deformability and a surface with peaks and protrusions capable of penetrating oxide layers formed on the metal bipolar plates.

In other embodiments, the distributor is made of a mesh or unflattened expanded metal having voids with diagonals comprised between 1 and 10 mm. In all cases, the distributor has a thickness comprised between 1 and 5 mm and is made of a material selected in the group comprising stainless steels, high-alloy steel, nickel and alloys thereof, copper and alloys thereof. In a further embodiment, the distributor may be made of a mesh or an expanded sheet, of the unflattened type, to ensure for a sufficient contact pressure on the bipolar plate and at the same time form channels for feeding the gas and discharging the produced water and condensates.

The present invention will be now described making reference to the photos and drawings, wherein the same numerals have been used to identify the same elements.

Figure 1:
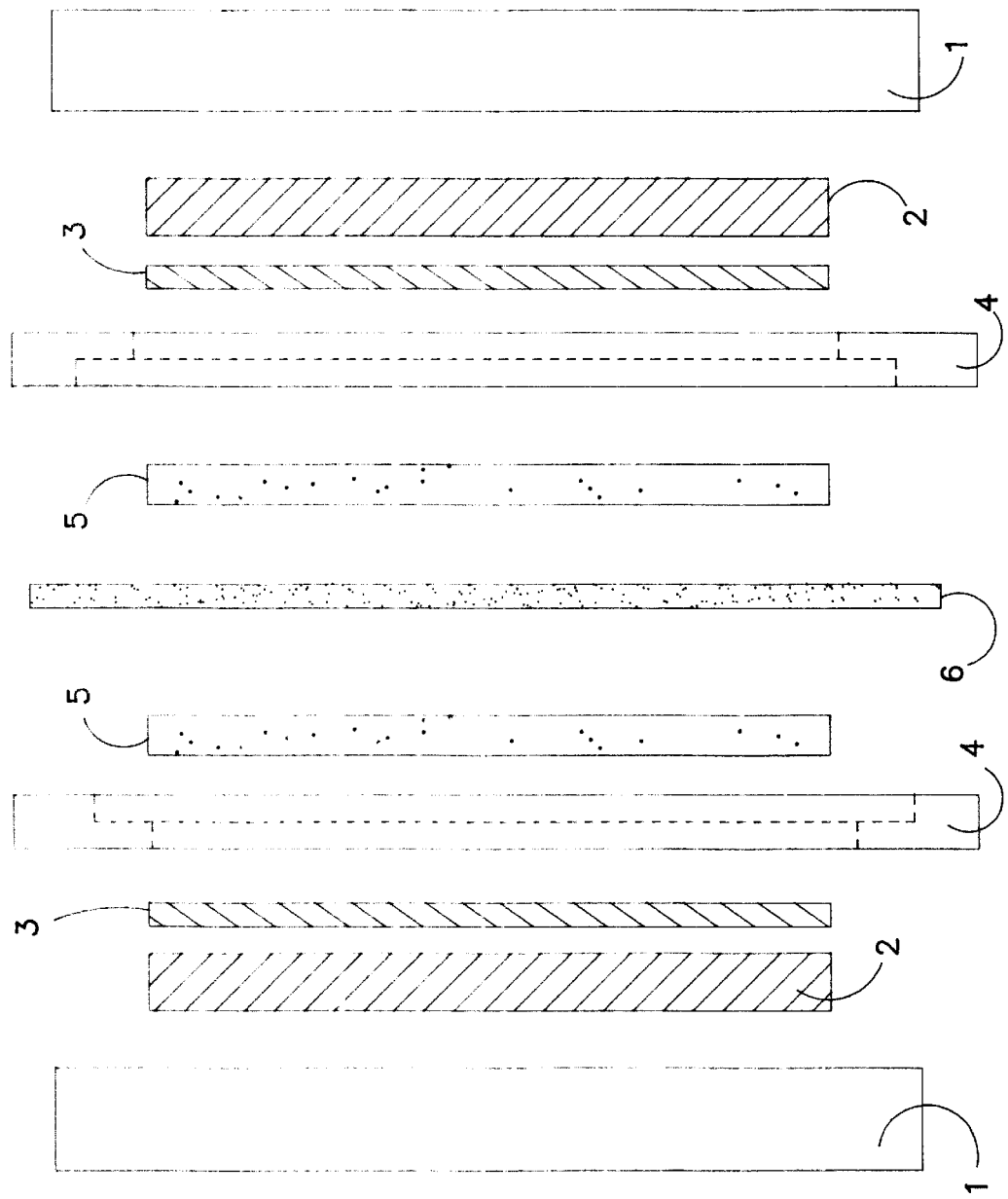
FIG. 1 is a sketch of the electrochemical cell of the invention

Making reference to FIG. 1, the cell of the invention comprises two bipolar plates (1), a pair of distributors (2), a pair of current collectors (3), a pair of gasket frames (4) provided with channels for feeding the gaseous reactants and discharging the excess reactants and condenses, a pair of gas diffusion electrodes (5), an ion-exchange membrane (6).

Alternatively, the cell may comprise two bipolar plates (1), only one distributor (2) coupled with only one current collector (3) and a gas diffusion electrode (5), all assembled, as for the first embodiment, on the same side of the membrane (6); further, a pair of gaskets (4) and, on the other side of the membrane (6), any configuration of electrolysis half-cell, not shown in the figure.

Figure 2:
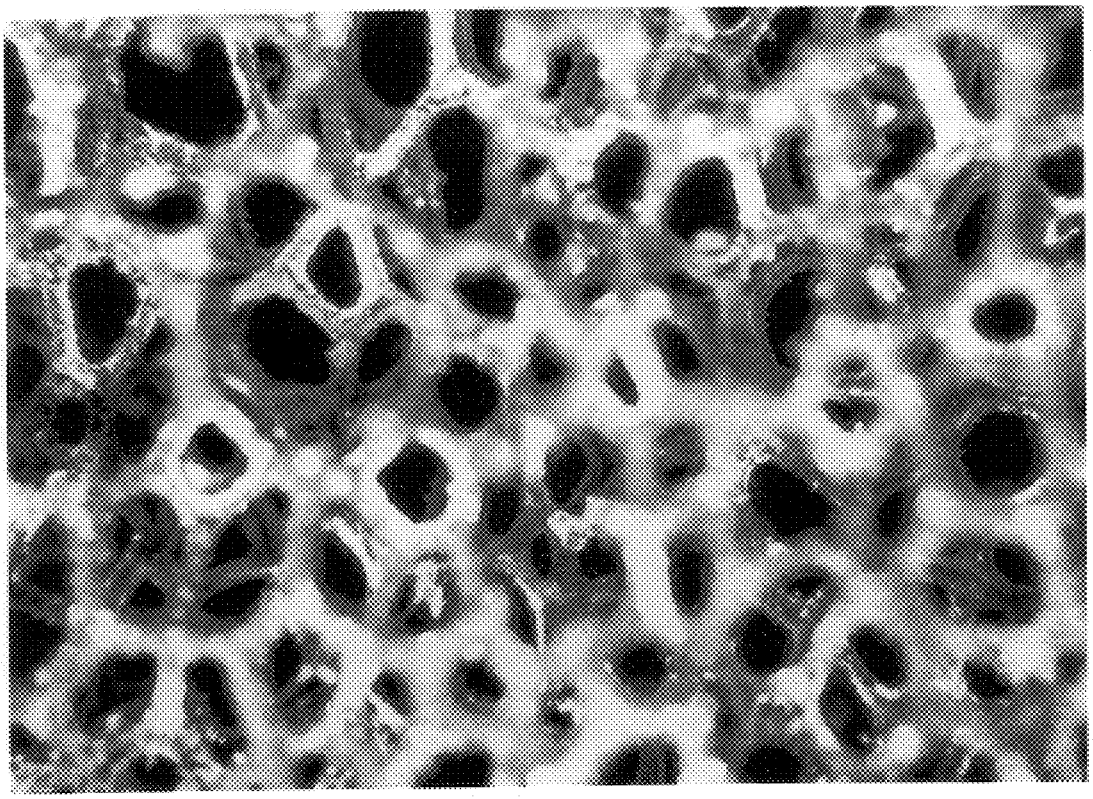
FIG. 2 is a magnified photo to the reticulated material, identified as metal sponge, not collapsed, used as gas distributor.

FIG. 2 shows a detail of the gas distributor made of the so-called metal foam, that is a metal reticulated material, the cells of which may have a close or open geometry, on the surface of which sharp peaks protrude in a statistically homogeneous distribution, which are capable, under the pressures typically exerted after clamping of the cell and comprised between 5 and 25 kg/cm$^2$, of breaking the oxide surface layer formed on the bipolar plate (1), typically made of passivatable metals such as aluminum, titanium and alloys thereof, or stainless steel. The reticulated material has a sufficient deformability and resiliency in order to comply with possible asperities of the bipolar plate, has a negligible electric contact resistance with the bipolar plate, sufficient thermal conductivity to disperse the generated heat, low ohmic drops for the longitudinal flow of the reactants and a good hydraulic permeability to permit easy release of the water generated by the cathodic half-reaction.

Figure 3:
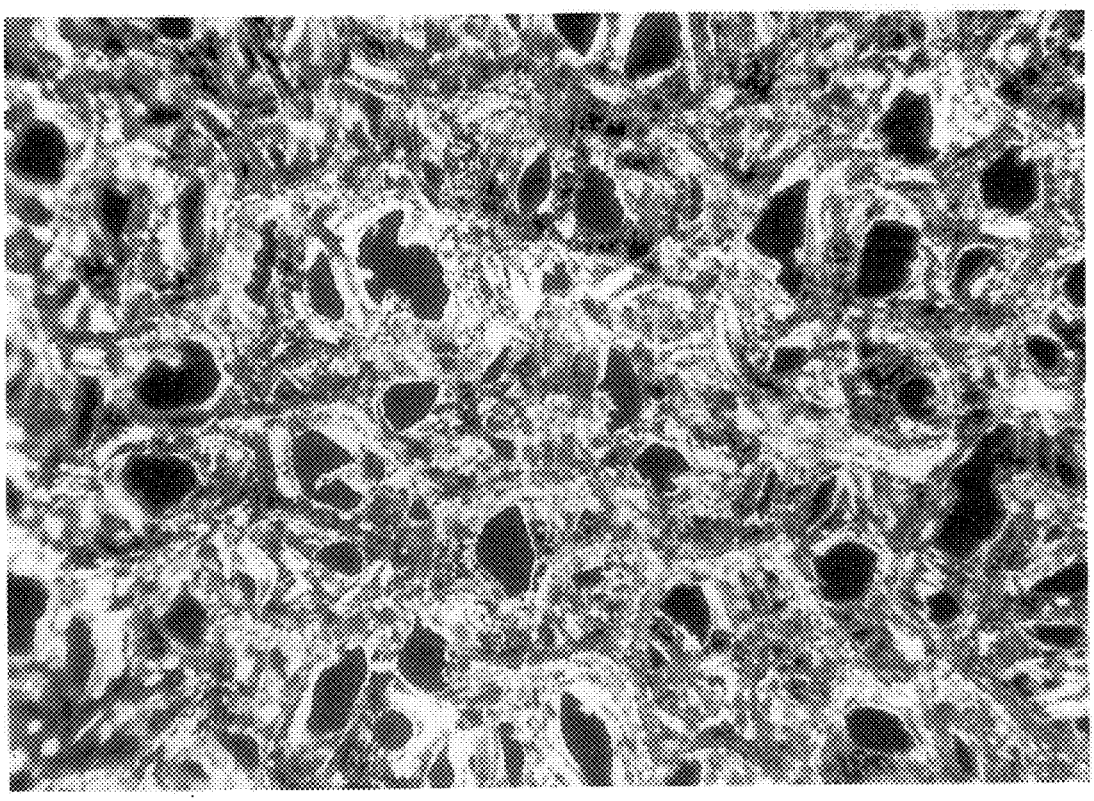
FIG. 3 is a magnified photo of the same material upon complete collapsing of the tridimensional cells used as current collector.

The photo of FIG. 3 shows a detail of the current collector having the same structure of FIG. 2, but subjected to mechanical machining consisting in applying an orthogonal pressure onto the plane of the collector pressed between two perfectly planar sheet, thus making the tridimensional structure collapse, obtaining a porous sheet having a constant thickness. The thickness of the collector thus obtained does not depend, to a large extent, on the pressure exerted during machining but only on the geometrical characteristics of the fibers forming the material.

The collector thus obtained has a remarkable residual porosity permitting the flow of the reactants, an essentially planar surface permitting the distribution of the electric contact no more on single points but along finite segments. The total surface area is at least one order of magnitude higher than that obtained with the uncollapsed material of FIG. 2. Therefore, by applying the usual clamping load, the pressure exerted onto the various points of the electrodes is not sufficient to perforate the same and damages the membranes even if the latter are very thin, also when the electrode is not protected by a supporting cloth, felt or graphite or carbon paper, but consists of a very thin deposit or even a direct metallization (activation) of the membrane with catalytic particles. As the final product is obtained by collapsing a certain number of layers previously disposed in a tridimensional network, the final porosity is very narrow and penetration by the sharp peaks of the distributor (2) is avoided. Besides protecting the integrity of the membrane, the product greatly improves the electric contact on the electrode side as it minimizes the path that the electric field must follow on the electrode plane, with respect to what would happen using as the collector the distributor (2), the contact of which is by points and not by segments, that is the expanded mesh or sheet, the void ratio of which is rather limited.

In an alternative embodiment, the collector may be a very thin gauze, preferably flattened by rolling, with a void ratio close to the unit and in any case much higher than that obtained with a mesh. The gauze has also the possibility of adapting to possible asperities of the electrodic surface.

Figure 4:
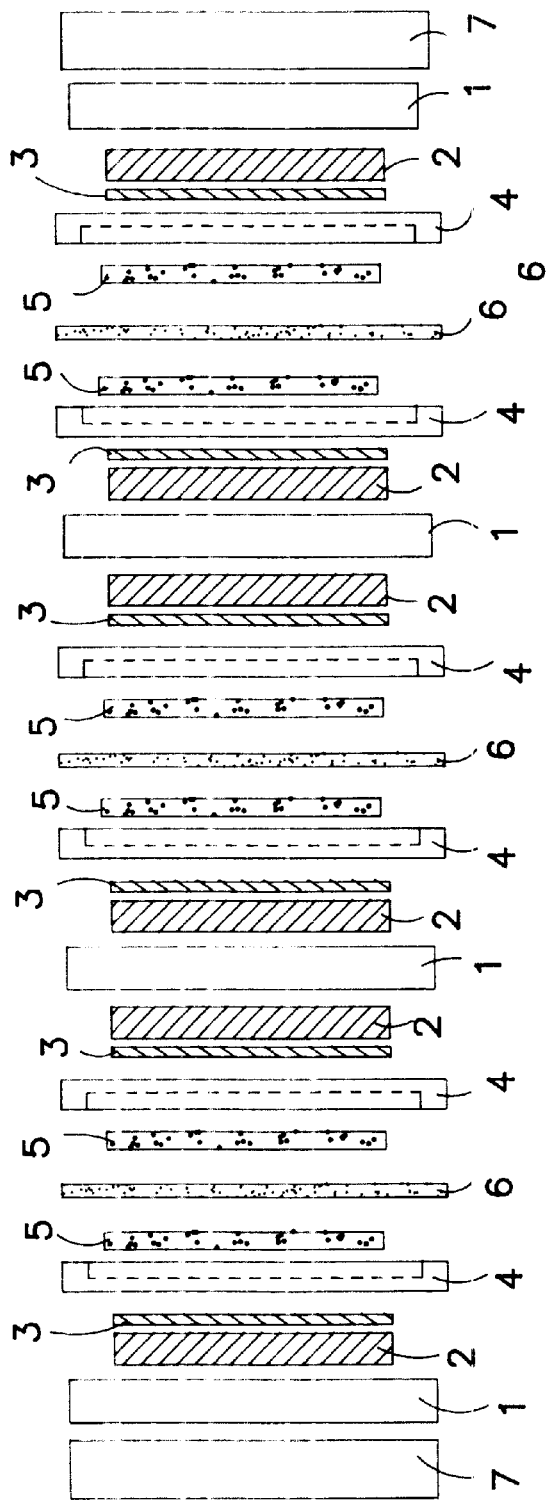
FIG. 4 is a scheme of a fuel cell stack of the invention.

FIG. 4 shows an arrangement of fuel cells in a stack; the end-plates (7) are connected to an external power circuit which withdraws the electric current generated by the stack.

The invention will be further illustrated resorting to some examples, which are not intended however to limit the invention thereto.

EXAMPLE 1

Six fuel cells connected in electrical series have been assembled in a stack according to the scheme illustrated in FIG. 4. Each cell comprised a pair of bipolar plates (1 in FIG. 4), a pair of gas distributors (2), a pair of current collectors (3), a pair of gaskets (4) provided with channels for feeding the gaseous reactants and discharging the excess reactants and condensates, a pair of gas diffusion electrodes (5), an ion-exchange membrane (6), and two end-plates (7) connected to the external circuit for withdrawing the generated electric current.

The general operating conditions, kept constant during the test, were as follows:

dimensions of the electrodes, gas distributors and current collector: 20 cm×20 cm membranes: Nafion® 112, supplied by Du Pont de Nemours, USA, with a thickness of about 0.06 mm electrodes: thin film obtained from an ink containing:
a hydro-alcoholic suspension made of the same polymer as the membrane, commercialized by Solution Technology, USA, under the commercial trade name of Nafion Solution 5
electrocatalytic powder based on Platinum supported on carbon
aqueous suspension of Teflon 30 N®, commercialized by Du Pont de Nemours, USA.

The paint (ink) thus obtained has been directly brushed onto the two side of the membrane up to obtaining a Platinum load of 2 g/m².

active area of the membrane: 20 cm×20 cm gaskets in the form of a frame having internal dimensions of 20 cm×20 cm and external dimensions of 25 cm×25 cm, 1.6 mm thick, provided with channels for feeding the gaseous reactants and discharging the excess reactants and condenses. Construction material: Hytrel®, commercialized by Du Pont de Nemours, USA bipolar plates made of Anticorodal 100 TA 16 (Italian Standards) aluminum alloy, with external dimensions of 30 cm×30 cm and fins to provide for cooling with forced air, obtained by shaping of commercial sheets 5 mm thick.

Feeding to the anode compartment (negative) pure hydrogen at an absolute pressure of 350000 Pa, pre-humidified at 80° C. in an external vessel, with a flow rate 1.5 times the stoichiometry of the reaction.

Feeding to the cathode compartment (positive) purified synthetic air at an absolute pressure of 400000 Pa, pre-humidified at 80° C. in an external vessel Average cell temperature: 70° C.

Total current density: 8000 Amperes/m² of active area

Total operation time: 400 hours

Each cell was equipped with the following alternative components:

A. Gas distributor made of the reticulated tridimensional material of FIG. 2, made of a 50—50 chromium-nickel alloy, with an average diameter of the pores of about 0.2 mm and a thickness of 1.3 mm. Materials of this type are commercially available from different suppliers under the trade name of metal foams.

B. Gas distributor made of an unflattened AISI 304 stainless steel sheet with a total thickness of 1.3 mm C. Current collector made of the same material as the gas distributor of A, previously collapsed by applying pressure between two planar plates to obtain a porous sheet 0.3 mm thick with an average diameter of the pores of about 0.1 mm D. Current collector consisting of thin gauze made of AISI 316-L stainless steel, obtained from a wire having a diameter of 0.15 mm, with a total thickness of about 0.3 mm E. Current collector consisting of an unflattened AISI 304 stainless steel expanded sheet, with a total thickness of 0.3 mm F. Current collector consisting of a planar AISI 304 stainless steel mesh obtained by interweaving a wire with a diameter of 0.15 mm, with a total thickness of 0.3 mm.

The average cell voltages referred to the single cells, expressed as millivolt are reported in Table 1.

TABLE 1

| distributor collector | A | B |
|---|---|---|
| C | 736 | 736 |
| D | 730 | 729 |
| E | 654 | 654 |
| F | 650 | 652 |

EXAMPLE 2

Six fuel cells have been connected in electrical series, each one comprising a pair of bipolar plates (1 in FIG. 4), a pair of gas distributors (2), a pair of current collectors (3), a pair of gaskets (4) provided with channels for feeding the gaseous reactants and discharging the excess reactants and condenses, a pair of gas diffusion electrodes (5), an ion-exchange membrane (6). Another fuel cell has been connected to the first six cells in electrical series, which cell comprised a pair of bipolar plates (1), the reticulated current collector (3) (metal foam), a pair of gaskets (4) provided with channels for feeding the gaseous reactants and discharging the excess reactants and condensates, a pair of gas diffusion electrodes (5), an ion-exchange membrane (6). All the cells have been assembled in a stack according to the assembling scheme of FIG. 4, with two end-plates (7) at both ends, connected to an external circuit withdrawing the generated current.

The general operating conditions, kept constant during the test, are as follows:

dimensions of the electrodes, gas distributors and current collector: 20 cm×20 cm membranes: Nafion® 115, supplied by Du Pont de Nemours, USA, with a thickness of about 0.15 mm electrodes: flexible carbon cloth, coated on the side in contact with the membrane by a film containing electrocatalytic particles supported on an active carbon, supplied by E-TEK, USA under the trade-mark ELAT™ with a thickness of 0.5 mm, and a platinum load of 10 g/m². The activated surface has been subsequently coated with a polymer similar to that of the membrane, by spraying a suspension containing the polymer, commercialized by Solution Technology, USA under the tradename of "Nafion Solution 5". The electrodes have not been heat pressed on the membrane before assembling of the stack.

active area of the membrane: 20 cm×20 cm gaskets in the form of a frame having internal dimensions of 20 cm×20 cm and external dimensions of 25 cm×25 cm, 1.6 mm thick, provided with channels for feeding the gaseous reactants and discharging the excess reactants and condensates. Construction material: Hytrel®, commercialized by Du Pont de Nemours, USA bipolar plates made of Anticorodal 100 TA 16 (Italian Standards) aluminum alloy, with external dimensions of 30 cm×30 cm and fins to provide for cooling with forced air, obtained by shaping of commercial sheets 5 mm thick.

Feeding to the anode compartment (negative) pure hydrogen at an absolute pressure of 350000 Pa, pre-humidified at 80° C. in an external vessel, with a flow rate 1.5 higher than the stoichiometry of the reaction.

Feeding to the cathode compartment (positive) purified synthetic air at an absolute pressure of 400000 Pa, pre-humidified at 80° C. in an external vessel Average cell temperature: 70° C.

Total current density: 8000 Amperes/m² of active area

Total operation time: 400 hours

The first six cells were equipped with the following alternative components:

A. Gas distributor made of the reticulated tridimensional material of FIG. 2, made of a 50 chromium—50 nickel alloy, with an average diameter of the pores of about 0.2 mm and a thickness of 1.3 mm. Materials of this type are commercially available from different suppliers under the trade name of metal foams.

B. Gas distributor made of an unflattened AISI 304 stainless steel sheet with a total thickness of 1.3 mm C. Current collector made of the same material as the gas distributor of A, previously collapsed by applying pressure between two planar plates to obtain a porous sheet 0.3 mm thick with an average diameter of the pores of about 0.1 mm D. Current collector consisting of thin gauze made of AISI 316-L stainless steel, obtained from a wire having a diameter of 0.15 mm, with a total thickness of about 0.3 mm E. Current collector consisting of an unflattened AISI 304 stainless steel expanded sheet, with a total thickness of 0.3 mm F. Current collector consisting of a planar AISI 304 stainless steel mesh obtained by interweaving a wire with a diameter of 0.15 mm, with a total thickness of 0.3 mm.

The seventh cell was equipped with an G, similar to A but with a thickness of 1.6 mm, acting as gas distributor and at the same time, being in direct contact with the electrode, as current collector.

The average cell voltages referred to the single cells, expressed as milliVolt are reported in Table 2.

TABLE 2

| distributor collector | A | B | G |
|---|---|---|---|
| C | 632 | 630 | |
| D | 625 | 622 | |
| E | 587 | 585 | |
| F | 580 | 577 | |
| — | | | 586 |

EXAMPLE 3

Three fuel cells (defined as X type) have been connected in electrical series, each one comprising a pair of bipolar plates (1 in FIG. 4), a pair of gas distributors (2) made of the reticulated tridimensional material of FIG. 2, made of a 50—50 nickel-chromium alloy, with an average diameter of the pores of about 0.2 mm and a thickness of 1.3 mm, a pair of current collectors (3) made of the same material as in FIG. 3, previously collapsed by applying pressure between two planar plates to obtain a porous sheet 0.3 mm thick with an average diameter of the pores of about 0.1 mm, a pair of gaskets (4) provided with channels for feeding the gaseous reactants and discharging the excess reactants and condensates, a pair of gas diffusion electrodes (5), an ion-exchange membrane (6).

Three additional three fuel cells (defined as Y type) have been connected in series to the first three cells, comprising a pair of bipolar plates (1), the element of FIG. 2, made of the reticulated tridimensional material of FIG. 2, made of a 50—50 chromium-nickel alloy, with an average diameter of the pores of about 0.2 mm and a thickness of 1.6 mm, a pair of gaskets (4) provided with channels for feeding the gaseous reactants and discharging the excess reactants and condensates, a pair of gas diffusion electrodes (5), an ion-exchange membrane (6)

The six fuel cells have been assembled in a stack according to the assembling scheme of FIG. 4, with two end-plates (7) at both ends, connected to the external circuit for withdrawing electric current.

The following parameters have been kept constant:

dimensions of the electrodes, gas distributors and current: 20 cm×20 cm membranes: Nafion® 112, supplied by Du Pont de Nemours, USA, with a thickness of about 0.06 mm electrodes: thin film obtained from an ink containing:
a hydroalcoholic suspension made of the same polymer as the membrane, commercialized by Solution Technology, USA, under the commercial trade name of Nafion Solution 5
electrocatalytic powder based on platinum supported on carbon aqueous suspension of Teflon 30 N®, commercialized by Du Pont de Nemours, USA.

The ink thus obtained has been directly brushed onto the two side of the membrane up to obtaining a platinum load of 2 g/m².

active area of the membrane: 20 cm×20 cm gaskets in the form of a frame having internal dimensions of 20 cm×20 cm and external dimensions of 25 cm×25 cm, 1.6 mm thick, provided with channels for feeding the gaseous reactants and discharging the excess reactants and condenses. Construction material: Hytrel®, commercialized by Du Pont de Nemours, USA bipolar plates made of Anticorodal 100 TA 16 (Italian Standards) aluminum alloy, with external dimensions of 30 cm×30 cm and fins to provide for cooling with forced air, obtained by shaping of commercial sheets 5 mm thick.

Before starting the stack, a leak test has been carried out pressurizing the anode compartment with nitrogen at a relative pressure of 50000 Pa; a visible gas bubbling has been observed on the water head at the outlet of the cathode compartment, suggesting the rupture of at least one membrane (6), the element acting as the physical separator between the two compartments.

The fuel cell stack has been disassembled and each membrane has been subjected to a leak-test, by immersion in water in the horizontal position inside an hydraulically tight system wherein the membrane acted as separator and pressurizing with nitrogen the bottom side of the membranes.

The results have been as follows:

No leaking through the three membranes contained in X type cells was observed

Substantial leaking occurred in the three membranes previously assembled in the Y type cells, with damages in the form of small pinholes across the whole surface.

The above examples demonstrate that a separation between the two functions of withdrawing current from the electrode and of distributing reactants inside the gas compartments of a membrane electrochemical cell is absolutely necessary, if highly efficient and thus extremely thin electrodes and membranes are to be used. The aforementioned current collectors (identified as C, D, E, F in Example 1) provide for an optimum protection of the membrane against holes, if combined with the gas distributors (identified as A and B).

However, as regards resistivity, the collectors identified as C and D offer remarkable advantages over E and F, due to the better distribution of the electric contact characterized by an average shorter path of the current lines on the electrode surface, which is made of non metallic material negatively affected by resistivity penalties.

This applies also to the case when collectors C and D are compared to the element of FIG. 2 acting both as collector and distributor, as illustrated in Example 2, with conventional membranes and electrodes.

The contact with sharp peaks with a homogeneous statistical distribution all over the surface must still be provided by the gas distributor onto the aluminum bipolar plate, which is not affected by these penalties having a substantially lower resistivity and on which it is furthermore necessary to exert a pressure sufficient to locally break the passivation oxide layer naturally formed onto its surface.

EXAMPLE 4

Four fuel cells connected in electrical series have been assembled in a stack according to the scheme illustrated in FIG. 4. Each cell comprised a pair of bipolar plates (1 in FIG. 4), a pair of gas distributors (2), a pair of current collectors (3), a pair of gaskets (4) provided with channels for feeding the gaseous reactants and discharging the excess reactants and condenses, a pair of gas diffusion electrodes (5), an ion-exchange membrane (6), and two end-plates (7) connected to the external circuit for withdrawing the generated electric current.

The general operating conditions, kept constant during the test, were as follows:

dimensions of the electrodes, gas distributors and current collector: 20 cm×20 cm membranes: Nafion® 112, supplied by Du Pont de Nemours, USA, about 0.06 mm thick current collector: collapsed nickel-chromium foam, as illustrated in FIG. 3 active area of the membrane: 20 cm×20 cm gaskets in the form of a frame having internal dimensions of 20 cm×20 cm and external dimensions of 25 cm×25 cm, 1.6 mm thick, provided with channels for feeding the gaseous reactants and discharging the excess reactants and condensates. Construction material: Hytrel®, commercialized by Du Pont de Nemours, USA bipolar plates made of Anticorodal 100 TA 16 (Italian Standards) aluminum alloy, with external dimensions of 30 cm×30 cm and fins to provide for cooling with forced air, obtained by shaping of commercial sheets 5 mm thick.

Feeding to the anode compartment (negative) pure hydrogen at an absolute pressure of 350000 Pa, pre-humidified at 80° C. in an external vessel, with a flow rate 1.5 times the stoichiometry of the reaction.

Feeding to the cathode compartment (positive) purified synthetic air at an absolute pressure of 400000 Pa, pre-humidified at 80° C. in an external vessel Average cell temperature: 70° C.

Total current density: 8000 Amperes/m² of active area

Total operation time: 900 hours

Each cell was equipped with the following alternative components:

A. Gas distributor made of the reticulated tridimensional material of FIG. 2, made of a 50 chromium—50 nickel alloy, with an average diameter of the pores of about 0.2 mm and a thickness of 1.3 mm. Materials of this type are commercially available from different suppliers under the trade name of metal foams.

B. Gas distributor made of an unflattened AISI 304 stainless steel sheet with a total thickness of 1.3 mm H. electrodes in the form of a thin film obtained from an ink containing:

a hydro-alcoholic suspension made of the same polymer as the membrane, commercialized by Solution Technology, USA, under the commercial trade name of Nafion Solution 5 electrocatalytic powder based on Platinum supported on carbon aqueous suspension of Teflon 30 N®, commercialized by Du Pont de Nemours, USA. The ink thus obtained has been partially coagulated by sonication and applied by spatulation on one side of the anodic and cathodic current collector up to obtaining a platinum load of 2 g/m² corresponding to a total thickness of 0.02 mm.

J. Electrodes obtained from a flexible carbon cloth, coated on the side in contact with the membrane by a film containing electrocatalytic particles supported on an active carbon, supplied by E-TEK, USA under the trade-mark ELAT™, having a thickness of 0.5 mm and a platinum load of 10 g/m². The activated surface has been subsequently coated with a polymer similar to that of the membrane, by spraying a suspension containing the polymer, commercialized by Solution Technology, USA under the tradename of "Nafion Solution 5".

The average cell voltages referred to the single cells, expressed as milliVolt are reported in Table 3.

TABLE 3

| distributor electrode | A | B |
|---|---|---|
| H | 736 | 736 |
| J | 733 | 731 |

We claim:

1. An electrochemical cell comprising two end-plates, bipolar plates adjacent to the end plates, permeable metal distributors, porous and permeable metal current collectors, gasket frames provided with means for feeding the gaseous reactants and removing the excess reactants and condensates, gas diffusion electrodes and an ion-exchange membrane, said metal current collectors having a distributed segmented contact area free of peaks and protrusions and smooth surface without asperites, at least one of said collectors is made of a reticulated tridimensional material the cells of which are completely collapsed after application of pressure between two planar plates, said at least one collector having thereby no residual deformability.

2. The cell of claim 1 wherein said cell is a fuel cell fed with a reactant containing hydrogen at anode compartment (negative pole) and an oxidant containing air at the cathode compartment (positive pole).

3. The cell of claim 1 wherein at least one of said collectors has a final thickness comprised between 0.1 and 0.5 mm.

4. The cell of claim 1 wherein at least one of said collectors is made of an electrically conductive and corrosion resistant material selected from the group consisting of stainless steel, high-alloy steel, nickel, nickel-chromium, titanium coated by conductive oxides and gold.

5. The cell of claim 1 wherein at least one of said collectors is made of a metal gauze.

6. The cell of claim 5 wherein said gauze is essentially flat, with a thickness comprised between 0.1 and 0.3 mm, and with a porosity not lower than 50%.

7. The cell of claim 1 wherein at least one of said metal distributors is made of a reticulated tridimensional material having a porosity of at least 50%, a diameter of the metal fibers comprised between 0.1 and 1 mm and a residual deformability and elasticity after being compressed upon clamping of the cell, said distributors having a surface provided with a multiplicity of contact points with a limited area.

8. The cell of claim 1 wherein said distributor is made of an electrically conductive and corrosion resistant material selected from the group consisting of stainless steel, high-alloy steel, nickel and alloys thereof, copper and alloys thereof.

9. The cell of claim 1 wherein at least one of said distributors consists of a mesh or unflattened expanded sheet having apertures with diagonals comprised between 1 and 10 mm, and a thickness comprised between 1 and 5 mm.

10. The cell of claim 1 wherein the ion-exchange membrane has a thickness below 0.1 mm.

11. The cell of claim 1 wherein the gas diffusion electrodes have a thickness below 0.03 mm.

12. The cell of claim 1 wherein the gas diffusion electrodes are made of a catalytic coating directly deposited onto said membrane.

13. A stack of electrochemical cells connected in electrical series wherein at least one of the cells is the cell of claim 1.

14. A method for preparing a current collector of claim 1 comprising positioning a tridimensional reticulated material having a porosity of at least 50%, a diameter of the metal fibers comprised between 0.1 and 1 mm, between two planar plates and applying an orthogonal pressure onto said plates up to completely collapsing the tridimensional reticulated material and eliminating residual deformability.

* * * * *